United States Patent
Le Cam et al.

(10) Patent No.: US 9,082,279 B2
(45) Date of Patent: Jul. 14, 2015

(54) METHOD FOR SECURELY DEMATERIALIZING THE TRANSFER OF EVIDENCE IN DATA-STREAM PRODUCTION SYSTEMS, IN PARTICULAR VIDEO-SURVEILLANCE SYSTEMS

(75) Inventors: Michel Le Cam, Marcoussis (FR); Youcef Semsoum, Vincennes (FR); Jean-François Sulzer, Sevres (FR)

(73) Assignee: THALES, Courbevoie (FR)

( * ) Notice: Subject to any disclaimer, the term of this patent is extended or adjusted under 35 U.S.C. 154(b) by 416 days.

(21) Appl. No.: 13/376,100

(22) PCT Filed: May 28, 2010

(86) PCT No.: PCT/EP2010/057402
§ 371 (c)(1),
(2), (4) Date: Apr. 20, 2012

(87) PCT Pub. No.: WO2010/139619
PCT Pub. Date: Dec. 9, 2010

(65) Prior Publication Data
US 2012/0216043 A1    Aug. 23, 2012

(30) Foreign Application Priority Data
Jun. 5, 2009 (FR) ...................... 09 02731

(51) Int. Cl.
*H04L 9/28* (2006.01)
*G08B 13/196* (2006.01)
*H04N 21/8358* (2011.01)
*H04L 9/32* (2006.01)

(52) U.S. Cl.
CPC ........ *G08B 13/19656* (2013.01); *H04L 9/3247* (2013.01); *H04L 9/3263* (2013.01); *H04L 9/3297* (2013.01); *H04N 21/8358* (2013.01); *H04L 2209/60* (2013.01)

(58) Field of Classification Search
CPC . H04L 9/3297; H04L 2209/60; H04L 9/3263; H04N 21/8358
USPC ............... 713/176, 200, 171; 726/3; 380/200
See application file for complete search history.

(56) References Cited

U.S. PATENT DOCUMENTS

| 2004/0085446 | A1 | 5/2004 | Park |
| 2005/0091524 | A1* | 4/2005 | Abe et al. ................. 713/200 |
| 2005/0120201 | A1* | 6/2005 | Benaloh et al. .............. 713/155 |
| 2006/0075235 | A1 | 4/2006 | Renkis |
| 2007/0079012 | A1* | 4/2007 | Walker .................. 709/249 |
| 2008/0031448 | A1 | 2/2008 | Dang et al. |
| 2009/0245268 | A1* | 10/2009 | Pugliese, IV ............... 370/401 |
| 2009/0251311 | A1* | 10/2009 | Smith et al. ............. 340/539.13 |
| 2011/0055895 | A1* | 3/2011 | Roskowski et al. ............... 726/3 |

FOREIGN PATENT DOCUMENTS

FR    2884678 A1    10/2006

\* cited by examiner

*Primary Examiner* — Mohammad A Siddiqi
(74) *Attorney, Agent, or Firm* — Baker & Hostetler LLP

(57) ABSTRACT

A method including putting in place an end-to-end secure network, digitally signing the recorded data, regardless of its type, encrypting the recorded sensitive data, and putting in place a key management infrastructure for the creation, the renewal, the distribution and the repudiation of the keys, and putting in place an evidence administration process which guarantees the time-stamping of the digital signature, the validation of this digital signature and the ultimate archiving of the legal evidence of the integrity and of the authenticity of the video stream.

7 Claims, 3 Drawing Sheets

METHOD FOR SECURELY DEMATERIALIZING THE TRANSFER OF EVIDENCE IN DATA-STREAM PRODUCTION SYSTEMS, IN PARTICULAR VIDEO-SURVEILLANCE SYSTEMS

CROSS-REFERENCE TO RELATED APPLICATIONS

This application is a National Stage of International patent application PCT/EP2010/057402, filed on May 28, 2010, which claims priority to foreign French patent application No. FR 09 02731, filed on Jun. 5, 2009, the disclosures of each of which are incorporated by reference in their entireties.

FIELD OF THE DISCLOSED SUBJECT MATTER

The present invention relates to a method for securely dematerializing the transfer of evidence in data L-stream production systems, in particular video-surveillance systems, and a system for implementing such a method. More generally, the invention applies to any sensors to produce fast digital data streams, such as an audio system, a document digitizing assembly or an industrial process.

BACKGROUND

With the improvements to its quality and with the proliferation in the number of cameras installed, video surveillance is increasingly often being used as an evidence element in law. Consequently, it has to be incontestable. More generally, good practices in protecting the private lives of citizens and the sensitivity of certain scenes observed are making it necessary to limit access to the video-surveillance data only to authorized people. Given these conditions, the authorities are having to enact strict rules controlling access to the video-surveillance systems, and to recommend, often in vague terms, the implementation of suitable technical procedures.

Typically, the procedure in many countries stipulates that, in order to collect evidence intended for the legal system, a judiciary police officer has to go to the storage server (which is itself constructed according to the best practices in terms of security) to collect the evidence item by personally copying the desired sequences onto a non-rewritable physical medium.

The recent extension of the IP architectures (use of the Internet protocols) to the shot-taking and of the shared transmission means (wireless or wired) further increases the threats of intrusion into the transmission system and, more generally, of fraudulent manipulation so as to corrupt the data.

The current response among the operators responsible for defining the systems and the integrators who design them is to try to physically secure the complete transmission systems between cameras and storage and display means. This requires expensive private data links and often centralization of the storage which makes it possible to dispense with the need for a judiciary police officer to go to the storage server, and dispense with the technical medium that has to accompany him or her, whereas a distributed storage would be the best topology.

Even though this legal insecurity is now minimal, disputes by one of the parties concerning the authenticity of the evidence which might have been manipulated by source replacement, elimination of objects from the image, etc., will continue to occur given the major issues involved, such as the possibility of the information obtained on analyzing a black box after an aircraft disaster being compromised.

The adoption by the video-surveillance systems of network infrastructures is a recent development, and the technical developments are frequent and rapid. Since cost is often a decisive factor, security still generally appears only as a minimum option.

The techniques currently employed to enhance security are limited to watermarking (adding a watermark, invisible overlaid information, whose function is to guarantee that the data are not modified) when encrypting the data (with general-purpose algorithms) during recording. Still at the level of just the recorders, the digital signature technique has been proposed, but with no signature key management policy (IGC or PKI) and with no evidence server.

When the video-surveillance systems include links between nodes, these nodes themselves have a processing capability, the techniques applicable to digital communications, such as the creation of a virtual private network (known by the acronym VPN) are naturally applicable, but cover, for their protection, only the exchanges between the points concerned.

Moreover, in the field of administrative and financial transactions, which correspond to limited exchanges of data in a succession of short sessions, "trust platform" techniques have been developed and are implemented for the general public (secure payments, dematerialized tax declarations, etc.).

SUMMARY

A subject of the present invention is a method for making it possible to overcome the limitations mentioned above without being a significant burden on the costs, at the level of all the elements of a system for transmitting data streams to be secured, and in particular a video-surveillance system, from the source of these data to the place of archiving and to do so in a totally dematerialized manner, guaranteeing access control and authentication, as well as the integrity of the contents.

The method according to the invention is characterized in that it consists in implementing the following security functions:

a secure end-to-end network is put in place and authentication mechanisms are used at the level of each player in the secure network, as is the encrypting of the data passing between the players, the recorded data is digitally signed, regardless of its type, the recorded sensitive data is encrypted, a key management infrastructure is put in place for the creation, the renewal, the distribution and the repudiation of the keys, and an evidence administration process is put in place which guarantees:

the time-stamping of the digital signature;

the validation of this digital signature;

the ultimate archiving of the legal evidence of the integrity and of the authenticity of the video stream.

According to one aspect of the invention, the method is characterized in that it comprises the following steps:

upon the production of the data streams, signing and authentication operations are performed on these data, the data stream production devices being protected against intrusions, the data streams are then symmetrically encrypted and asymmetrically hashed, the keys and the certificates are managed in normal operating mode and in maintenance mode, the duly processed streams are transmitted via a secure tunnel to an NVR-type server which records the received data, said server is protected against intrusions and data signing and authentication, and encryption, operations are also performed for this server, and the keys and the certificates are managed at the level of this server in normal operating mode and in maintenance mode.

BRIEF DESCRIPTION OF THE DRAWINGS

The present invention will be better understood from reading the detailed description of an embodiment, taken as a nonlimiting example and illustrated by the appended drawing, in which.

DETAILED DESCRIPTION

The present invention aims to overcome the difficulties, cost overheads and threats described above, by adapting to the video-surveillance systems, which require both a high bandwidth and streaming capability, the computer network securing techniques, by adding thereto the digital trust platform technologies used in administrative and financial transactions.

Specifically, the invention involves, by introducing therein the video constraints of the following five security functions together:

A—putting in place an end-to-end secure network for the video surveillance, with, in particular, the use of authentication mechanisms at the level of each player in the secure network and encrypting the data passing between the players;

B—digitally signing the recorded data, regardless of its type (video, audio, metadata and traces);

C—encrypting the recorded sensitive data, given that there is a risk of the recorded information being displayed by unauthorized third parties by physically accessing the storage media;

D—putting in place a key management infrastructure (called IGC or PKI), for the creation, the renewal, the distribution and the repudiation (repudiation should be understood here to mean the immediate and definitive rejection of an authorization if all the conditions required for its validity are not demonstrated) of the keys (certificates);

E—putting in place an evidence administration process which guarantees:
  the time-stamping of the digital signature;
  the validation of this digital signature;
  the ultimate archiving of the legal evidence of the integrity and of the authenticity of the video stream.

Thus, an important characteristic of the invention consists, not in physically and independently securing each branch of the system, but in providing, in each active component of this system (camera, storage node, peripheral device, etc.), a processing capability that makes it possible to include it in a "trust bubble" (or "secure bubble") as described hereinbelow with reference to FIG. 2. In the case of cameras, where the sensor could, by malicious intent, be separated from the electronics, this integrity is guaranteed by mechanical anti-intrusion sealing contrivances.

Among other benefits, the invention makes it possible, without risking comprising or modifying the functionalities, to rely on any telecommunication network, including wireless, and also to authenticate, as described below, with legal evidential value, the videos collected.

If necessary, this level of security can be augmented by equipping each element with a strong authentication mechanism (dual-factor identification), by putting in place access-limiting techniques (firewalls, service quality) and intrusion detection techniques (IDS).

Figure 1:
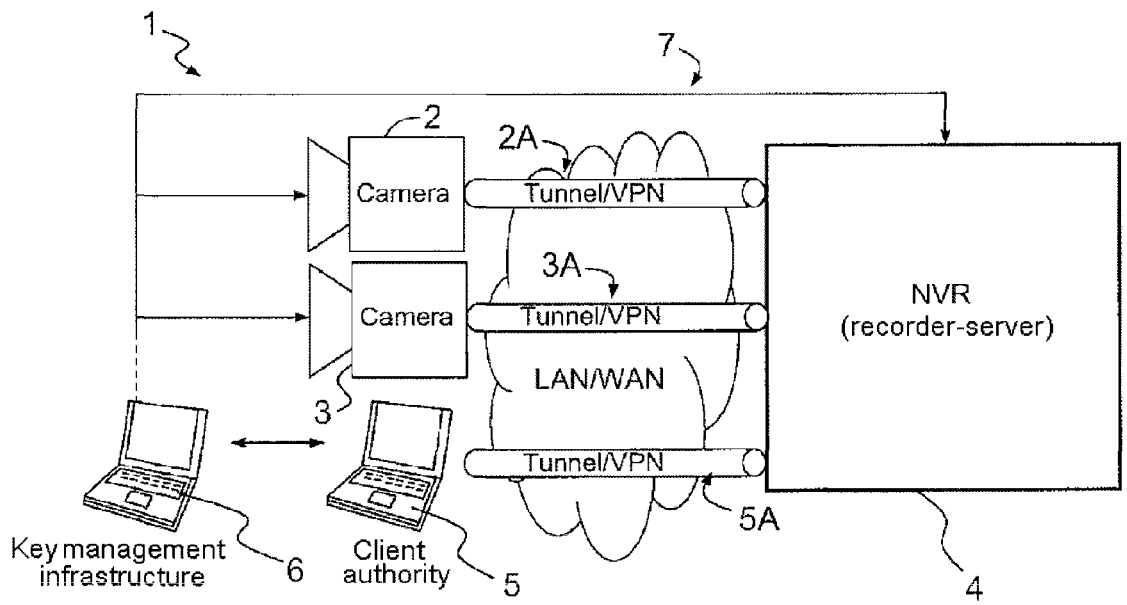
FIG. 1 is a block diagram of a simple exemplary implementation of the invention comprising only two cameras.

FIG. 1 schematically shows a simple exemplary implementation of the invention. This simplified system 1 in this example comprises only two cameras 2, 3, a data server/recorder 4, called NVR (Network Video Recorder), a client authority 5 (state, police, or other such authority), cooperating with a key management system 6, and secure communication means 7 between the NVR 4 and the elements 2, 3 and 5.

This implementation is produced, on each camera, by the addition or the installation (in the form of a dedicated processor if the main processor responsible for the compression and smart video functions does not have the desired capabilities) of an additional processing capability to perform:

the final operations ("final" inasmuch as they are performed only when all the operations on the contents are finished and they are ready to be transferred) of signing and authenticating (random number generator, RSA encryption), constituting the authentication function (FA) of the subscriber to the network that is the camera, so as to ensure that there has been no substitution;

an encryption function or stream processing cryptographic function (called MCTF) for performing the symmetrical encryption and asymmetrical hashing of the data streams (video and auxiliary data) so as to protect them in their path from the camera output, the transmission to the server 4 being performed by creating a secure tunnel, using, for example, a VPN (Virtual Private Network) of "open VPN" type, in which the client is the camera (2, 3 respectively) and the server is the NVR 4;

the management of the keys and certificates (creation, renewal, deletion), in normal operation (when the camera is connected to the system) and in maintenance mode (when the system is being installed or reinstalled).

The camera, thus equipped with security functions, takes the form of a mechanical assembly comprising electrical or other detection devices, ensuring a sealing function such that any physical intrusion attempt results in the loss of the authentication and encryption keys, almost instantaneously prohibiting any data transmission.

Each camera 2, 3 is linked to the NVR 4, as indicated above, via a secure tunnel 2A, 3A respectively, through a standard IP network by using common exchange protocols.

Still in this simple implementation example, the NVR is a computer of PC server type including the usual data recording, data server (multimedia streams, metadata) and time server/relay functions. It does, however, differ from the prior art by the addition of the same security functions as those of each camera, described above (with the physical anti-intrusion devices, also described), complemented with two additional security functions:

the access of each client control to the system is controlled according to the rights assigned on each VPN connection, the first part of the evidence administration process consisting in time-stamping the signature in accordance with the RFC 3161 standard using the TSP (Time Stamp Protocol) standard protocol. The outcome of this step is the production of a digital envelope XADES_T.

This same simple implementation handles the signing of the recorded data by exploiting the fact that, each camera being linked to the NVR by a secure tunnel, the whole forms a logically linked unit or "secure bubble". Under these conditions, a signature on the NVR, associated with a unique identifier for each camera (for example its MAC address) makes it possible to guarantee the authenticity of the data.

Figure 2:
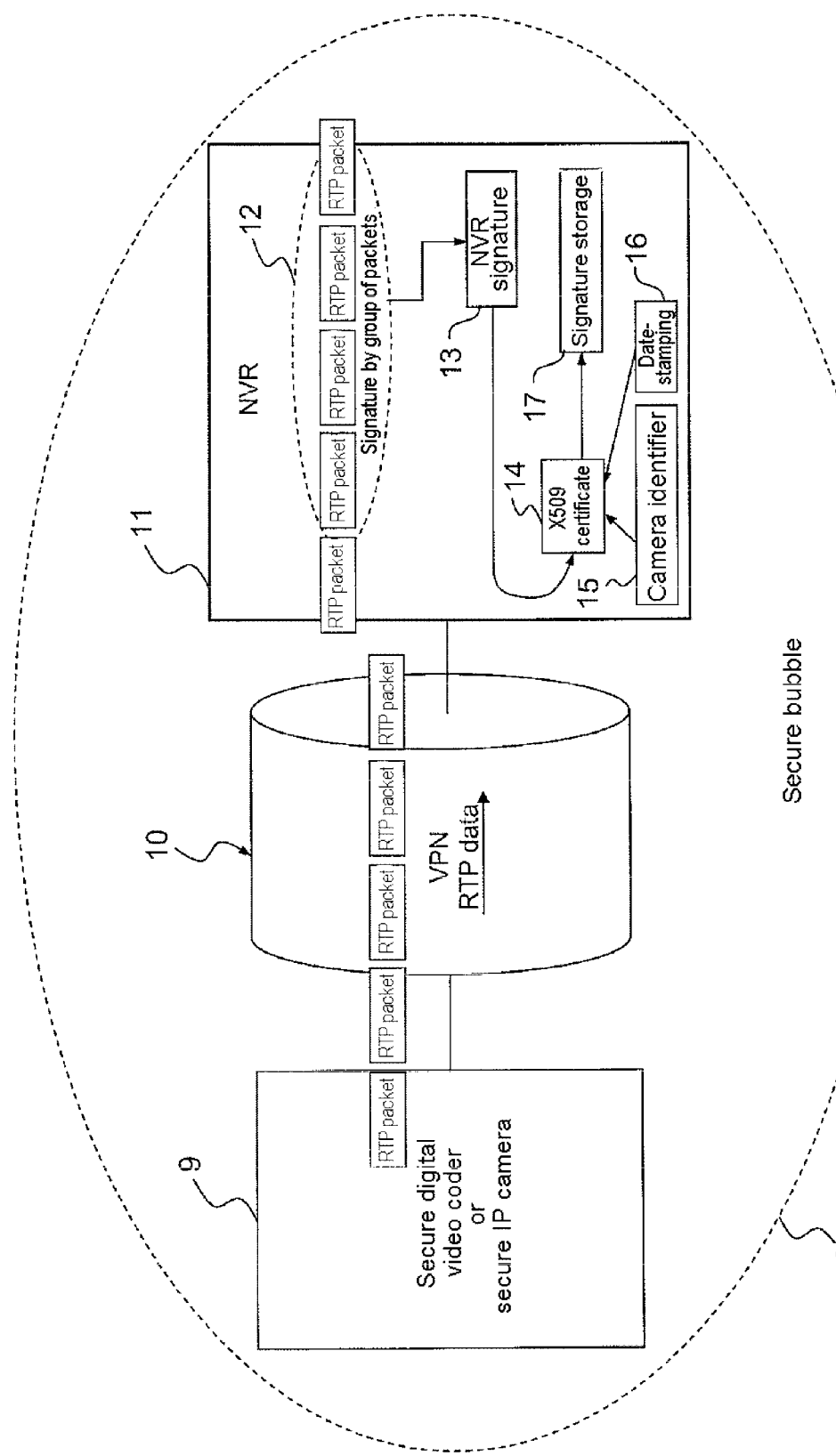
FIG. 2 is a flow diagram of an exemplary "secure bubble" used by the invention.

FIG. 2 schematically shows a "secure bubble" 8 mainly comprising: a secured digital video coder or a secure IP camera 9, a VPN network 10 for transmitting RTP data in packets, and an NVR 11. In this NVR 11, the successive RTP packets are taken in groups of packets 12, and their NVR signature 13 is determined for each group of packets. This NVR signature is processed to obtain an XADES-type signature 14. A non-refutable certificate is then obtained (in a conventional way, according to the internationally recognized X.509 format) using the identifier 15 of the corresponding camera and the time-stamp 16 of the corresponding shot. The duly obtained signature is then stored securely (17).

The advantage of the solution of the invention is that the system is not restricted by the size of the RTP/SRTP transport layer packets and that a signature can be affixed by blocks (the groups 12 of FIG. 2) of configurable duration, typically a few tens of seconds for each camera, while remaining compatible with the standardized video formats compatible with the display devices retained.

The signature format used may, for example, be based on the "XAdES v1.1.1" (XML advanced electronic signature, version 1.1.1) standard by using a detached signature. The signature is said to be detached when it relates to the resources external to the document that contains it (the external resource being an imprint of the document or digest which is the result of a calculation on the content of the document to be signed based on an algorithm which requires no keys or other parameters).

It will be noted that the XAdES v1.1.1 standard extends the specification of the IETF/W3C XML signature syntax and processing (http://www.w3.org/TR/XAdES/) in the field of non-repudiation, by defining XML formats for the secure electronic signatures conforming to the "Directive 1999/93/EC of the European Parliament and of the Council of 13 Dec. 1999 on the community framework for electronic signatures". It provides an authentication and a protection of integrity which satisfies in particular the legal obligations for secure electronic signatures under French law 2000-230.

The client authority 5 is also typically a PC-type computer linked to the NVR (operating as server) by a secure tunnel 5A similar to the other tunnels 2A, 3A of the system, through which the useful data are transferred. It is this client authority which implements the evidence administration process consisting in time-stamping the signatures and validating them and handles the archiving with probative value of the data.

To complement the device, and in line with the local procedure rules, a video-surveillance system is generally required to provide the evidence of the reliability of the electronic signature in case of legal dispute. To this end, the basic system described above is added to an evidence administration platform, providing the evidence of the reliability of the signature and handling the archiving of this evidence in a database. This principle, which forms part of the prior art, is nevertheless reviewed below with reference to FIG. 3.

Figure 3:
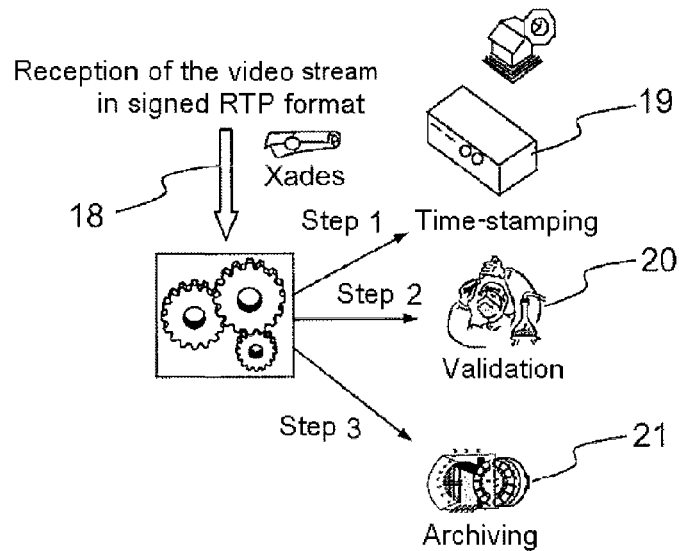
FIG. 3 is a time-oriented diagram of an evidence administration platform of known type that can be used by the present invention.

In this FIG. 3, the evidence administration process provides the evidence of the reliability of the secure electronic signature from a video stream 18 in signed RTP format (for example in XAdES format) by performing the following tasks:

time-stamping 19: the signed stream 18 then benefits from a certain date (certified date-stamp);

validation 20: the integrity of the data and of the certification system is verified.

Moreover, the validation server countersigns the validity of the exchange;

archiving 21: the data, the signature, the time-stamping token and the counter-signature by the evidence server are sealed and stored. This assembly constitutes the evidence of the reliability of the secure electronic signature (as also indicated in 17 in FIG. 2).

According to the preferred implementation of the invention, the evidence administration process is not done completely on the data that is of legal interest (alarms, extractions), the other data being intended to be lost later when the legal retention time has ended.

Figure 4:
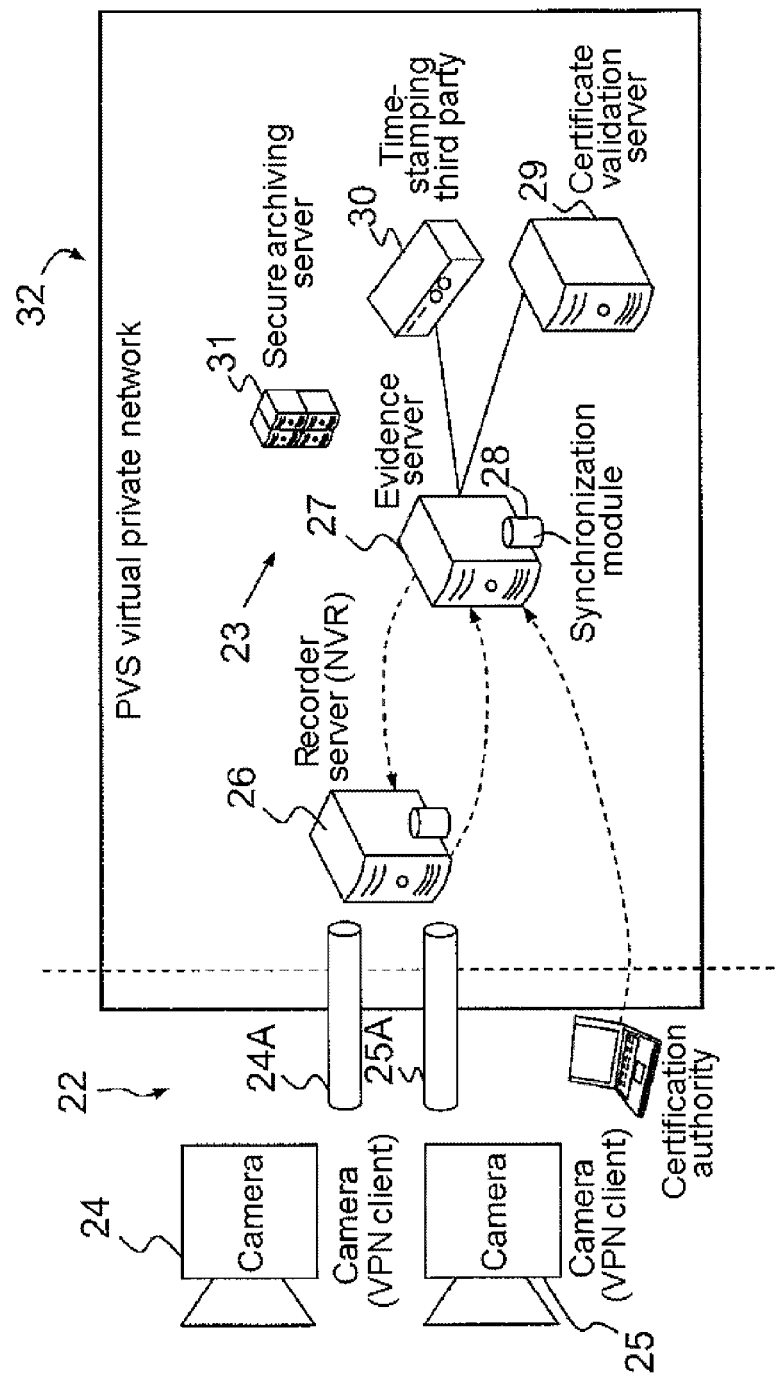
FIG. 4 is a block diagram of an exemplary system for implementing the evidence of reliability of a signature that can be used by the present invention.

FIG. 4 schematically shows a system for implementing the invention. It comprises a "trust bubble" 22 similar to that of FIG. 2 and a set 23 of physical machines.

The bubble 22 mainly comprises: digital cameras, for example two of them, namely the cameras 24 and 25, these cameras being linked by VPN client tunnels, 24A and 25A respectively, to an NVR recorder-server 26. The elements 26 to 31 constitute a virtual private network 32 which then becomes a secure video-surveillance platform (PVS).

The set 23 of machines comprises:

a server 27 dedicated to the evidence "workflow" (it handles the management of the evidence tasks), to which is added a synchronization module 28;

a server 29 dedicated to the certificate validation module;

a server 30 dedicated to time-stamping;

and a server 31 dedicated to secure archiving.

This segmentation in terms of dedicated servers to precisely defined tasks corresponds to the breakdown recognized by the certification authorities concerning security of information and maintains the validity of algorithms already recognized.

The server 27 dedicated to the evidence "workflow" is for transmitting the signed video streams from the NVR to the evidence server 27.

In the evidence server 27, the synchronization module 28 is a "dormant" software module which is periodically triggered. It scans the data received by the NVR in order to recover the signed and marked video streams, to submit them to the evidence creation mechanism implemented by the servers 29 to 31.

The incoming video streams are marked (by the introduction of an identifier) when they are extracted or when they are linked to a particular event (alarm). The periodicity with which this marking process is triggered can be configured, typically from a few seconds to a minute.

The time-stamping server 30 is used to supply a generic "stamping service" to the "evidence creation service", a service implemented by the set of servers 27 to 31. The stamping gives a very significant legal value to the secure electronic signature since it largely addresses the issue of non-repudiation. The time-stamping server is called first when the evidence of the electronic signing of the video stream is created. Its time-stamping program is constrained to use the TSP (Time Stamp Protocol) protocol, in order to conform to the RFC 3161—TSP standard.

The validation server 29, called second when generating the evidence of the electronic signature, is used to supply the following services:

validation of the certification systems for the electronic certificates used with the certification authorities referenced through revoked certificate lists (LCR) [ ];

verification of the electronic signatures (integrity of the exchange and of the video streams); and cross-signing PVS, consisting in post-validation accrediting the validity of the received information.

The validation server 29 relies on the revoked certificate lists (LCR) from the certification authority (AC) referenced and stored in the database of the evidence server 27. The module 28, handling the synchronization of the LCR, is responsible for updating the LCR lists of the certification authorities referenced.

To verify the validity of the signatures of the video streams, the validation server 29 recovers, from the file associated with the extracted videos, the signatures in the XAdES_T format. The counter-signature used by the validation server 29 is provided on the basis of a digital certificate stored in the database of the evidence server 27.

The archiving server 31, called last when generating the evidence, is used to provide the following services:

recovering the data after the time-stamping and validation processing operations;

adding historical data;

sealing the archive for integrity;

storing the archive in the database of the evidence server.

Like the other elements 28 to 30, the archiving server 31 forms part of the "trust bubble" 22. The archiving is performed on the database of this server. The archiving function is implemented on the same physical machine as the database in order to dispense with network connections.

The counter-signature used by the sealing of the archive is carried out on a digital certificate stored in the database of the evidence server.

According to a variant of the invention, more complex, and when the application requires it, the NVR can handle the encryption of its disk so that the disk which would be extracted from the NVR by fraudulent methods cannot be read.

The invention claimed is:

1. A method for securely dematerializing transfer of evidence in a data-stream production system, said method comprising:

putting in place a secure end-to-end network for transmitting RTP (real-time transport protocol) packets and authentication mechanisms are used at a level of each element, including a camera, in the secure end-to-end network, as is encrypting of data passing between the elements;

digitally signing groups of RTP packets;

encrypting the data;

putting in place a key management infrastructure for creation, renewal, distribution and repudiation of keys; and putting in place an evidence administration process which guarantees:

time-stamping the digital signature, validating the digital signature, obtaining a non-refutable certificate using an identifier of the camera and a timestamp of the corresponding data, and ultimate archiving of legal evidence of integrity and of authenticity of a video stream, wherein a processing capability is provided in each active element of the system which makes it possible to include it in a "trust bubble".

2. The method according to claim 1, wherein a level of security of the system is augmented by equipping each element with a strong authentication mechanism and putting in place access-limiting techniques.

3. The method according to claim 1, the method further comprising:

upon producing data streams, signing and authenticating these data, data stream production devices being protected against intrusions;

symmetrically encrypting and asymmetrically hashing the data streams;

managing in normal operating mode and in maintenance mode the keys and certificates;

transmitting the processed data streams via a secure tunnel to a Network Video Recorder (NVR)-type server which records received data; and protecting a server against intrusions and data signing and authentication, and encryption, operations are also performed for the server, and the keys and the certificates are managed at a level of the server in normal operating mode and in maintenance mode.

4. The method according to claim 1, wherein the data stream production system is a video-surveillance system.

5. The method according to claim 3, wherein access of each client to the system is controlled according to rights assigned on each connection to the secure tunnel.

6. The method according to claim 1, wherein the time stamping of the digital signature comprises time-stamping the digital signature in accordance with the RFC 3161 standard which relies on TSP (Time Stamp Protocol) standard protocol.

7. A system allowing secure dematerialization of transfer of proof in a system for producing flows of video-surveillance data, the system comprising:

sources, including a camera, for producing data flows, each source comprising signature and authentication; the signature are configured to digitally sign groups of RTP packets a processor including data recording, data server and server/time relay functions, the processor is configured to encrypt recorded data;

a secure communication between the sources and the processor for transmitting RTP packets, the communication comprising a secure tunnel which connects each source to the processor;

a key management infrastructure for creation, renewal, distribution and repudiation of keys;

putting in place an evidence administration process which guarantees:

a certificate validation server configured to validate the digital signature;

a time stamping server configured to timestamp the digital signature; and a secure archiving server configured to archive legal evidence of integrity and of authenticity of a video stream, wherein the processor obtains a non-refutable certificate using an identifier of the source and a timestamp of a corresponding data, and wherein a processing capability is provided in each active element of the system which makes it possible to include it in a "trust bubble".

* * * * *